(12) United States Patent
Kim (10) Patent No.: US 12,301,977 B2
(45) Date of Patent: May 13, 2025

(54) SOFTWARE APPLICATION LICENSE MANAGEMENT OF CAMERA DEVICE THROUGH MEDIATION DEVICE

(71) Applicant: HANWHA TECHWIN CO., LTD., Seongnam-si (KR)

(72) Inventor: Youngsam Kim, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 374 days.

(21) Appl. No.: 17/498,763

(22) Filed: Oct. 12, 2021

(65) Prior Publication Data

US 2022/0124245 A1    Apr. 21, 2022

(30) Foreign Application Priority Data

Oct. 16, 2020  (KR) .......................... 10-2020-0134679

(51) Int. Cl.
| | | |
|---|---|---|
| H04N 23/617 | (2023.01) | |
| G06F 8/65 | (2018.01) | |
| H04L 9/14 | (2006.01) | |
| H04L 9/32 | (2006.01) | |
| H04N 7/18 | (2006.01) | |

(52) U.S. Cl.
CPC ............. *H04N 23/617* (2023.01); *G06F 8/65* (2013.01); *H04L 9/14* (2013.01); *H04L 9/3247* (2013.01); *H04L 9/3265* (2013.01); *H04N 7/18* (2013.01)

(58) Field of Classification Search
CPC ........ H04N 23/617; H04N 7/18; H04N 7/183; H04N 23/661; G06F 8/65; G06F 8/61; G06F 21/105; G06F 21/33; H04L 9/14; H04L 9/3247; H04L 9/3265; H04L 9/0825; H04L 63/0876; H04L 67/34
See application file for complete search history.

(56) References Cited

U.S. PATENT DOCUMENTS

| | | | |
|---|---|---|---|
| 9,992,681 B2 * | 6/2018 | Lee ...................... | H04W 12/069 |
| 10,892,956 B2 * | 1/2021 | Nishikawa .............. | H04L 41/32 |
| 2007/0256134 A1 * | 11/2007 | Lehtonen ........... | G06Q 20/1235 726/26 |

(Continued)

FOREIGN PATENT DOCUMENTS

KR          102485857 B1 *   3/2019

*Primary Examiner* — Padma Haliyur
(74) *Attorney, Agent, or Firm* — McLean IP Global; Jason Y. Pahng (57) ABSTRACT

A program license management method disposed in the present disclosure includes an operation of receiving an authentication request from a mediation device, an operation of transmitting a request message for requesting installation of an application from a server to the authenticated mediation device after the mediation device is successfully authenticated, the request message including device identification information of a camera device, an operation of receiving signed information and application data from the mediation device, an operation of performing license validation including determination of whether the signed information includes the device identification information and determination of whether the signed information according to the server is valid, and an operation of installing the application data in the device when the license validation is successful.

11 Claims, 6 Drawing Sheets

(56) References Cited

U.S. PATENT DOCUMENTS

| | | | |
|---|---|---|---|
| 2011/0197077 A1* | 8/2011 | Chan | G06F 21/10 |
| | | | 713/189 |
| 2014/0157392 A1* | 6/2014 | Smith | H04L 63/10 |
| | | | 726/9 |
| 2016/0344561 A1* | 11/2016 | Grajek | H04L 63/0884 |
| 2017/0293987 A1* | 10/2017 | Chan | H04L 9/3247 |
| 2019/0089696 A1* | 3/2019 | Kim | H04L 63/126 |
| 2019/0327223 A1* | 10/2019 | Kumar | H04L 63/0853 |
| 2020/0119915 A1* | 4/2020 | Yan | H04L 9/0897 |
| 2020/0293632 A1* | 9/2020 | Uchibori | G06F 21/126 |
| 2021/0194704 A1* | 6/2021 | Chan | H04L 9/3265 |
| 2021/0240416 A1* | 8/2021 | Murayama | G06F 3/126 |
| 2021/0274086 A1* | 9/2021 | Ise | H04N 23/80 |

\* cited by examiner

SOFTWARE APPLICATION LICENSE MANAGEMENT OF CAMERA DEVICE THROUGH MEDIATION DEVICE

This application claims the benefit of Korean patent application no. 10-2020-0134679 filed on Oct. 16, 2020, which is incorporated herein by reference for all purposes as if fully set forth herein.

BACKGROUND OF THE DISCLOSURE

Field of the Disclosure

The technology disclosed in the present disclosure relates to software application license management of a camera device through a mediation device.

Related Art

Recent network cameras can be provided with various software applications. A user can purchase an application in a reliable online market such as an App store and install the application. In addition, the user can authenticate the application through a certificate.

SUMMARY

To determine whether a specific application installed in a network camera is reliable, a user or an operating system of the network camera needs to check license data issued by a server. However, a network camera does not always operate in an online state, and when camera user authentication or identification is not functionally performed, it is difficult to purchase and install an application and check the license thereof.

Furthermore, in the case of an application configured to be installed and executed in a network camera by a specific manufacturer or a specific device, it is necessary to perform a license validation operation on the basis of information capable of identifying a device in which the application will be installed.

The present disclosure provides a program license management method of a camera device. The method may include an operation of receiving an authentication request from a mediation device, an operation of transmitting a request message for requesting installation of an application from a server to the authenticated mediation device after the mediation device is successfully authenticated, the request message including device identification information of a camera device, an operation of receiving signed information and application data from the mediation device, an operation of performing license validation including determination of whether the signed information includes the device identification information and determination of whether the signed information according to the server is valid, and an operation of installing the application data in the device when the license validation is successful.

The above-described method and other embodiments may have the following features. The method may further include an operation of generating the request message, and the request message generation operation may include an operation of encrypting device identification information with a private key of the camera device and an operation of generating the request message on the basis of public key information in a cryptographic correlation with the private key and the encrypted device identification information.

The signed information may include a certificate of a publisher, signed data, and an electronic signature over the signed data. Whether the signed information is valid may be determined by validating the electronic signature using a public key included in the certificate of the publisher and determining whether the signed data is restored. Determination of whether the signed information is valid may include chain validation of whether the certificate of the publisher is valid on the basis of a certificate of a management agency of an ecosystem to which the publisher belongs.

Determination of whether the device identification information is included may include determination of whether device identification information included in the signed information is the same as the device identification information transmitted through the request message.

The present disclosure provides a program license management method of a mediation device. The method may include an operation of receiving, from a camera device, an application installation request message including device identification information, an operation of transmitting the installation request message to a server, an operation of receiving, from the server, signed information including the device identification information and application information, and application data in response to the installation request message, and an operation of transmitting the signed information and the application data to the camera device.

The above-described method and other embodiments may have the following features. The method may further include an operation of transmitting a camera authentication request to the camera device, and the application installation request message may be received from the camera device when authentication according to the camera authentication request is successful. A right to order application installation may be obtained from the camera device as a result of the camera authentication. The installation request message may be included in a request message for purchasing the application and transmitted to the server. The method may further include an operation of determining an access address of the server on the basis of information on the camera device. The method may further include an operation of determining an address of the server is determined on the basis of information on the camera device.

Furthermore, the present disclosure provides a program license management method of a server. The method may include an operation of performing user authentication on the basis of user authentication information of a mediation device, an operation of receiving an application installation request message generated in a camera device when the user authentication is successful, an operation of generating an electronic signature using a private key for device identification information included in the application installation request message and signed data including a certificate, an operation of generating signed information on the basis of the electronic signature and the signed data, and an operation of transmitting the signed information and application data to the mediation device.

The above-described method and other embodiments may have the following features. The application installation request message may include encrypted device identification information and a public key of the camera device, and the device identification information may be obtained by being decrypted from the encrypted device identification information using the public key of the camera device. The application installation request message may include encrypted device identification information and a public key of the camera device, and the device identification information may be obtained by being decrypted from the encrypted device identification information using the public key of the camera device.

Furthermore, the present disclosure provides a camera device. The camera device may include a communication unit configured to perform communication with a mediation device and a controller functionally connected to the communication unit and configured to execute a program for controlling the communication unit, wherein the controller may be configured to execute a program including commands for performing an operation of receiving an authentication request from the mediation device, an operation of transmitting a request message for requesting installation of an application from a server to the authenticated mediation device after the mediation device is successfully authenticated, the request message including device identification information of a camera device, an operation of receiving signed information and application data from the mediation device, an operation of performing license validation including determination of whether the signed information includes the device identification information and determination of whether the signed information according to the server is valid, and an operation of installing the application data in the device when the license validation is successful.

DESCRIPTION OF EXEMPLARY EMBODIMENTS

The technology disclosed in the present disclosure may be applied to a camera management device. However, the technology disclosed in the present disclosure is not limited thereto and may be applied to any electronic device and method to which the technical spirit of the technology is applicable.

The terms used in the present disclosure are merely used in order to describe particular embodiments, and are not intended to limit the spirit of the technology disclosed in the present disclosure.

All the terms including technical or scientific terms have the same meanings as generally understood by a person having ordinary skill in the art to which the present invention pertains unless mentioned otherwise. Unless differently defined in the present invention, such terms should not be interpreted in an ideal or excessively formal manner. Further, when the technical terms used in the present disclosure cannot correctly represent the technical spirit disclosed in the present disclosure, they should be replaced with technical terms that can be properly understood by those skilled in the art. Generally used terms, such as terms defined in a dictionary, should be interpreted to coincide with meanings of the related art from the context.

The terms "first" and/or "second" are used to describe various components, but such components are not limited by these terms. The terms are used to discriminate one component from another component. For example, a first component may be called a second component and the second component may be called the first component within the technical spirit of the present disclosure.

Hereinafter, embodiments of the present disclosure will be described in detail with reference to the attached drawings. The same or similar elements are designated by the same reference numerals and redundant description thereof is omitted.

In the following description of the present invention, a detailed description of known functions and configurations incorporated herein will be omitted when it may obscure the subject matter of the present invention. Further, the attached drawings merely aid in understanding the technical spirit of the technology disclosed in the present disclosure and do not limit the technical spirit.

Figure 1:
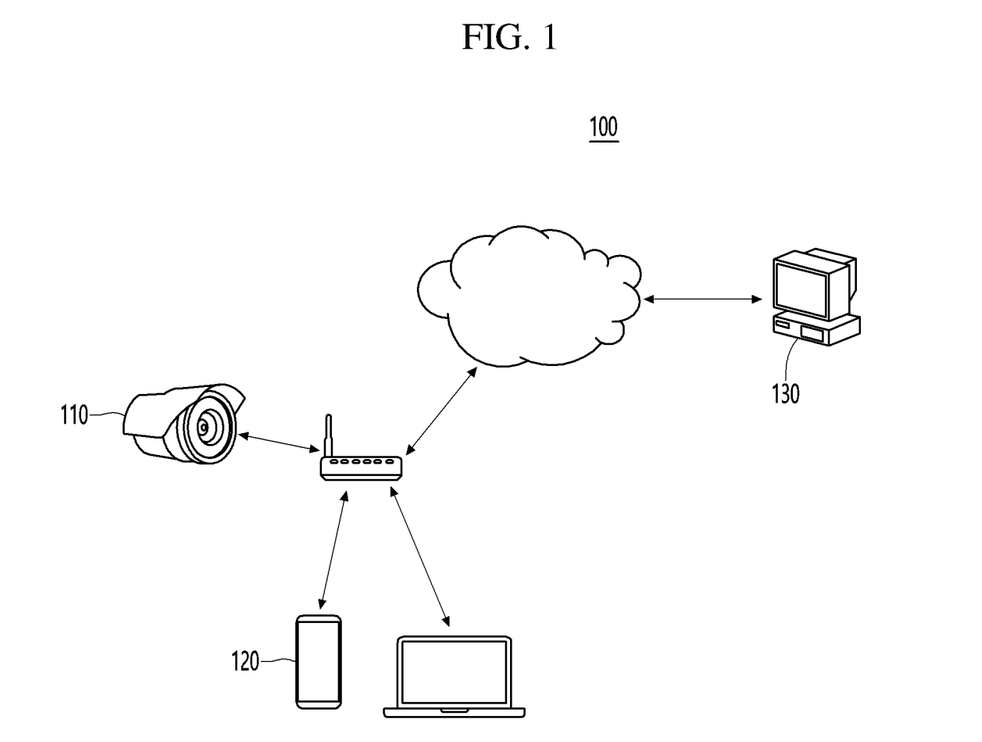
FIG. 1 schematically illustrates a system for managing a license of an application installed in a camera device.

FIG. 1 schematically illustrates a system 100 for managing a license of an application installed in a camera device. The camera management system 100 may include a camera device 110, a mediation device 120, and a server 130.

The camera device 110 may be connected to a network in a wired/wireless manner to perform communication with other devices. The camera device 110 according to an embodiment disclosed in the present disclosure may be called a surveillance camera or a closed-circuit television (CCTV) camera and may transmit captured images to an external device such as a management device through the network as described above. The camera device 110 may have one or more software applications installed therein and may be implemented as an electronic device provided with an operating system for the software applications. An application operating in the camera device 110 may be pre-loaded in a product or may be purchased from an application distribution server or an online store such as a marketplace and then installed in a system.

The camera device 110 may perform a validation operation for preventing installation of an unlicensed program such that a problem due to an application to be installed therein is not generated before installation of the application and may prohibit installation of the application when the application is determined to be an unlicensed application. Even after an application is installed in the camera device 110, the camera device 110 may perform an operation of checking whether the application is a licensed application as necessary. An application permitted to be used in the camera device 110 may be referred to as a licensed application.

License information representing that an application is licensed may be stored in the camera device 110 or included along with application data in information received from the server 130. The license information is received from the server 130, and when the camera device 110 can communicate with the server 130, the server 130 may transmit the license information to the camera device 110 in response to a request from the camera device 110.

However, in a state in which the camera device 110 is offline or cannot directly receive the license information from the server 130, the camera device 110 may indirectly receive the license information through another device. The camera device 110 may access the server 130 through another device and receive or validate the license information in a process of installing the application or checking the state of the installed application.

The network disclosed in the present disclosure may be, for example, a wireless network, a wired network, a public network such as the Internet, a private network, a global system for mobile communication network (GSM), a general packet radio network (GPRS), a local area network (LAN), a wide area network (WAN), a metropolitan area network (MAN), a cellular network, a public switched telephone network (PSTN), a personal area network, Bluetooth, Wi-Fi Direct, a near field communication network, an UltraWide band, a combination thereof, or another arbitrary network, but the network is not limited thereto.

There are various examples of environments in which the camera device 10 cannot perform direct communication with the server 130. For example, the camera device 110 may be configured to perform communication with a neighboring device through local area communication. For example, the camera device 110 may belong to a private network separate from a public network to which the server 130 belongs. The private network to which the camera device 100 belongs may be disconnected from other networks or configured such that access thereto is restricted and thus communication with the server 130 cannot be performed. In this case, for example, the private network to which the camera device 110 belongs may be a private network in which the manufacturer of the camera device 110 participates and the public network to which the server 130 belongs may be a public network in which a license information issuance agency, which is a management agency in which the manufacturer is involved, participates.

When the camera device 110 is in a disconnected environment as described above, the mediation device 120 may receive license information on a software application to be installed in the camera device 110 from the server 130 and forward the license information to the camera device 110. The mediation device 120 may transmit the license information through a real-time connection method. In addition, the mediation device 120 may receive the license information, store the license information, and then forward the license information to the camera device 110 through a store-and-forward method. Further, the mediation device 120 may be a device capable of transmitting data irrespective of a difference between communication methods in a state in which the device can be connected to both the network to which the camera device 110 belongs and the network to which the server 130 belongs. For example, when network operators of the networks to which the camera device 110 and the server 13 belong are different from each other, the mediation device 120 may forward the license information between the different commercial networks. The mediation device 120 may be implemented in various forms of electronic devices, such as a mobile device, a PC, and a workstation, and the implementation form thereof is not limited as long as it can execute functions disclosed in the present disclosure.

The server 130 provides a license for an application installed and executed in the camera device 110. The server 130 may operate as a device that provides a service of selling or distributing software applications executed in the camera device 110 and may be called, for example, an online store, an App store, a marketplace, or the like. The server 130 may be operated, for example, by the manufacturer of the camera device 110, a management agency in which the manufacturer participates, an application publisher, or the like. The server 130 may be implemented in various forms such as a single server, a plurality of servers, or a cloud, and the implementation form thereof is not limited as long as it executes functions disclosed in the present disclosure.

Figure 2:
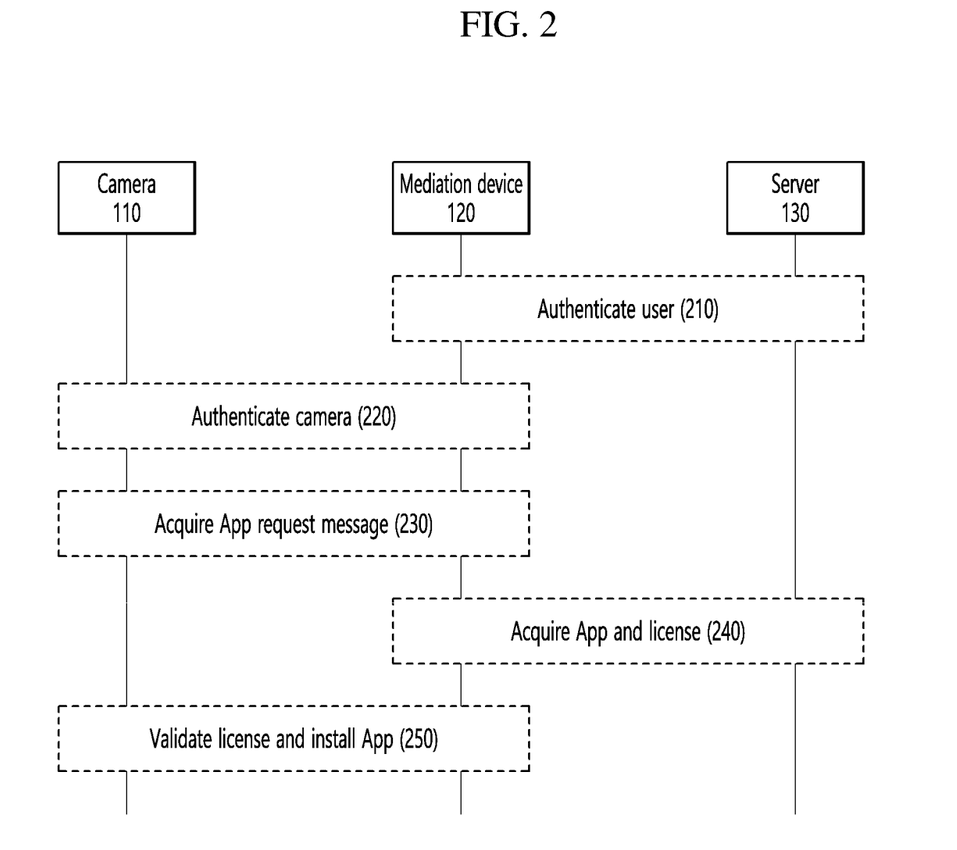
FIG. 2 is a flowchart illustrating a license data installation method of the camera device.

FIG. 2 is a flowchart illustrating a license data installation method of the camera device.

The mediation device 120 and the server 130 perform user authentication (210). To download an application from the server 130, an authentication procedure requested by the server 130 may need to be successfully performed. However, when the camera device 110 is offline, cannot directly access the server 130 due to a network configuration or state, or does not include a user interface (UI) necessary for user authentication in an application installation method according to a license management method disclosed in the present disclosure, the user authentication operation 210 performed by the mediation device 120 and the server 130 may replace user authentication for an application to be installed in the camera device 110. In this case, the authentication operation 210 may be performed between the mediation device 120 and the server 130 prior to an application purchase operation 240 for downloading actual application data, and the authentication operation 210 may be performed irrespective of a time at which a camera authentication operation 220 or an application request message acquisition operation 230 is performed, which is different from operations illustrated in FIG. 2.

The mediation device 120 and the camera device 110 perform camera authentication (220). The camera authentication operation 220 is performed in order to allow only an owner or an authorized user of the camera device 110 to access device identification information of the camera device 110 and to perform an operation of installing an application in the camera device 110.

After successful authentication through the camera authentication operation 220, the mediation device 120 acquires an application request message from the camera device 110 (230). The application request message may include information necessary for the mediation device 120 to acquire an application to be installed in the camera device 110. The application request message may include device identification information of the camera device 110. The device identification information may include hardware information determined in a process of manufacturing or assembling the camera device. The device identification information may include, for example, at least a medium access control (MAC) address of a communication interface included in the camera device 110. Further, the device identification information may include at least information generated on the basis of at least a part of a camera unit, a controller, and a storage included in the camera device 110. In addition, the device identification information may be information arbitrarily allocated per camera device.

The application request message may be generated on the basis of a combination of the device identification information (e.g., MAC address) of the camera device and a device certificate.

More specifically, the application request message may be generated on the basis of the device identification information encrypted with a private key (of the camera device) and a public key in a cryptographic correlation with the private key.

Alternatively, the application request message may include the device identification information (e.g., MAC address) encrypted with the private key and the public key in a cryptographic correlation with the private key.

Thereafter, the mediation device 120 acquires license data and application data from the server 130 on the basis of the application request message acquired from the camera device 110 (240). In the application acquisition operation 240, the mediation device 120 may additionally perform an operation of selecting an application to be acquired from an application list provided by the server 130 on the basis of application information included in the application request message. Further, the mediation device 120 may additionally perform an operation of paying for the application to be acquired in the application acquisition operation 240, and the application acquisition operation 240 may be a procedure of purchasing the application.

The server 130 generates license data on the basis of the device identification information included in the application request message. The license data includes signed information generated on the basis of the device identification information. The signed information may represent that the corresponding certificate has been issued for the camera device having the device identification information through a subsequent authentication procedure. Further, application data (or App data) configured to include the signed information may be controlled to be installed and executed only in the device having the device identification information through an authentication process.

Signed data described in the description may mean data that is an object of an electronic signature and electronic signature data may mean an electronic signature over signed data.

Further, the signed information may include signed data and electronic signatures and may be included in the license data.

In addition, the signed data may be included in signed data information, and the signed data information may be represented as SignedData Data.

Further, the electronic signatures may be included in electronic signature data.

Subsequently, the mediation device 120 transmits the acquired license data and the application data to the camera device 110, and the camera device 110 authenticates the license data and then installs the application data therein (250). Here, the license data may be included in the application data (or App data) or may be separately transmitted. The camera device 110 may authenticate the signed information included in the license data. The signed information may be configured to include signed data, and the signed data may include, for example, digest data with respect to an application program, certificate information used for electronic signature generation and validation, and device identification information. Further, the signed information may be configured to include electronic signatures with respect to the signed data. A cryptographic key used for this is a key pair that can be used for a public key infrastructure (PKI) based security protocol and may be used to execute functions such as generation and validation of electronic signatures using a pair of a private key and a public key generated according to cryptographic correlation.

According to an embodiment, the mediation device 120 may be implemented such that it includes a function of validating the license data. If the mediation device 120 is configured to manage a list of device identification numbers of camera devices and to perform signature validation, the mediation device 120 may confirm a device identification number in the signed information, select a camera device matching the confirmed device identification number, and transmit the application data.

Figure 3:
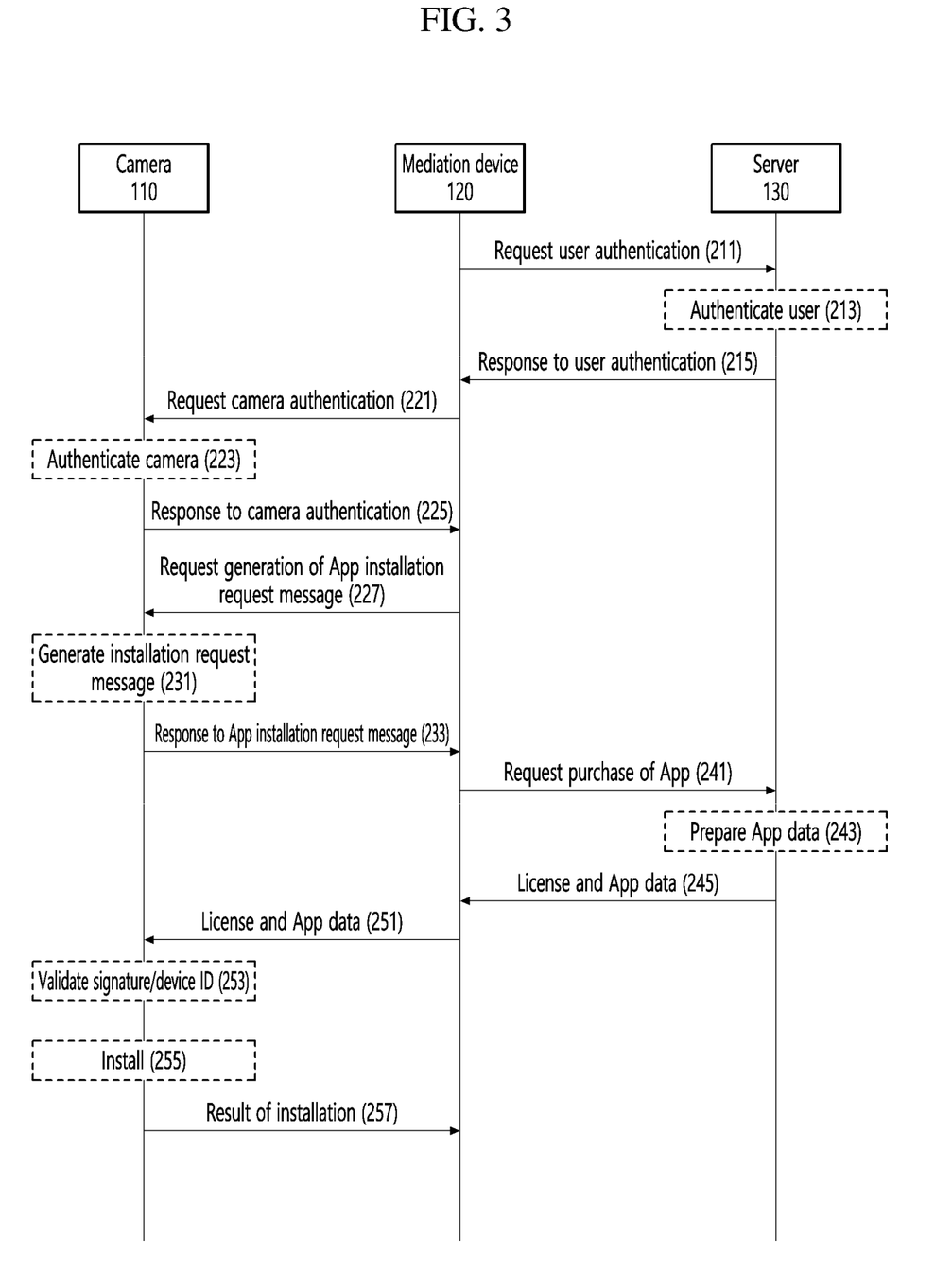
FIG. 3 is a flowchart illustrating a license validation and application installation method of the camera device in detail.

FIG. 3 is a flowchart illustrating a license validation and application installation method of the camera device in detail. Description of the same operations in FIG. 3 as those described with reference to FIG. 2 will be omitted.

The mediation device 120 transmits a user authentication request message to the server (211). The authentication request message corresponds to an authentication request message of an authentication method determined by the server 130. The server 130 may perform user authentication by comparing authentication data such as a code included in the authentication request message with a value prestored in the server 130 (213). Alternatively, the server 130 may perform the authentication operation 213 on the basis of the authentication data included in the authentication request message received from the mediation device 120 using another method or an external authentication service. The server 130 transmits a result of the authentication operation 213 to the mediation device 120.

The aforementioned user authentication operations 211, 213 and 215 are necessary for a subsequent application purchase request operation 241 of the mediation device 120 and may be omitted when user authentication has been performed with respect to the mediation device 120.

The mediation device 120 transmits a camera authentication request to the camera device 110 (221), and the camera device 110 performs an authentication operation on the basis of authentication data included in the transmitted camera authentication request (223) and transmits a camera authentication result to the mediation device 120. The camera authentication operation 223 may be user authentication or owner authentication performed between the camera device 110 and the mediation device 120. The camera authentication operation 223 may be an authentication process for allowing only the owner of the camera device 110 to be able to install an application in the camera device. For example, various methods such as asymmetric encryption, biometrics, a user name/code, a pre-shared key, and manufacture's serial number authentication may be additionally used for the camera authentication operation 223.

Upon successful reception of a response to camera authentication, the mediation device 120 may request generation of an application installation request message from the camera device 110 (227). Upon reception of the application installation request message, the camera device 110 generates the application installation request message including device identification information and application information (231).

The application installation request message generation operation of the camera device 110 may include operations of acquiring the device identification information of the camera device 110, encrypting the acquired device identification information with a private key of the camera device 110, and generating the application installation request message on the basis of public key information of the camera device in an cryptographic correlation with the private key and the device identification information.

The camera device 110 may transmit the generated application installation request message to the mediation device 120 in response to the operation 227 of requesting generation of the application installation request message (233).

Meanwhile, the camera authentication related operation and the application installation request message related operations may be implemented as one request and one response. That is, the mediation device 120 may transmit a single request representing the camera authentication request operation 221 and the application installation request message generation request 227 to the camera device 110, and the camera device 110 may transmit a single response representing the camera authentication response operation 225 and the application installation request message response operation 233 to the mediation device 120 in response thereto.

The device identification information may be hardware information determined in a process of manufacturing or assembling the camera device. The device identification information may include at least a medium access control (MAC) address of a communication interface included in the camera device 110, for example. Further, the device identification information may include at least information generated on the basis of at least a part of a camera unit, a controller, and a storage included in the camera device 110. In addition, the device identification information may be information arbitrarily allocated per camera device. Furthermore, the application information may be an application name, a universally unique identifier (UUID), or an application uniform resource locator (URL). The application information may be generated on the basis of information received from the mediation device 120 during a previous operation.

The mediation device 120 forwards the application installation request message to the server 130 (241). Upon reception of the application installation request message, the server 130 prepares license data and application data according to the application information included in the application installation request message (243) and transmits the license data and the application data to the mediation device 120. The device identification information in the application installation request message may be encrypted. In this case, the server 130 that has received the request message may perform an operation of checking whether the device identification information included in the request message has changed. For example, the server 130 may confirm that the device identification information has not changed by checking the encrypted device identification information using a public key of the camera device 110 included in the request message. Upon determining that the device identification information has changed, the server 130 may send a rejection response to an application purchase request message including the application installation request message without performing the application data preparation operation.

The application data may include an application program to be executed in the camera device 110 in which it is finally installed and may be compressed or may accompany other additional information.

The aforementioned operation of preparing the license data may include an operation of confirming an application program and generating a signature for the application program on the basis of information included in the application installation request message. The server 130 may select an application program according to the application information included in the application installation request message and generate license data for the application program on the basis of the device identification information included in the application installation request message. The license data may include signed information on the application program. For example, the signed information may be an electronic signed value using a private key related to a certificate to be used for authentication for signed data including a digest with respect to the application program, the certificate, and device identification information. For example, the certificate to be used for authentication may be a certificate issued for a publisher, and the publisher may be the manufacturer of the camera device, the author of the application program, or other agencies. A configuration of license data according to an embodiment will be described later with reference to FIG. 4.

The mediation device 120 receives the license data including the application data and the signed information and then forwards the license data to the camera device 110 (251). If the mediation device 120 manages a plurality of camera devices, the mediation device 120 may manage a list of device identification numbers of the camera devices. If the mediation device 120 can perform management and signature authentication, the mediation device 120 may confirm a device identification number in the signed information, select a camera device matching the confirmed device identification number, and transmit the application data to the camera device.

The camera device 110 receives the application data and the license data and then validates the license data (253). Here, the license data may be included in the application data and transmitted or received separately from the application data. Validation of the license data includes an operation of validating the signed information included in the license data. Validation of the signed information includes an operation of determining whether the signed information includes the device identification information and determining whether the signed information is valid. The signed information may be configured to include signed data and an electronic signature over the signed data, and the signed data may include, for example, digest data with respect to the application program, certificate information used for electronic signature generation and validation, and the device identification information. Determining whether the signed information is valid may be determining whether a result obtained by confirming the electronic signature using a public key included in the certificate information corresponds to the signed data. Further, determining whether the signed information is valid may be determining whether a certificate used to confirm the electronic signature has been legally issued by a certificate authority. Determining whether the certificate has been legally issued by a certificate authority may include an operation of performing chain validation of the certificate on the basis of a certificate of a management agency of an ecosystem to which the certificate authority belongs. In the case of the camera device 110, for example, the certificate may be a certificate issued for a publisher such as the camera device manufacturer or the application author, and the certificate of the management agency may be a certificate issued for management agencies such as a consortium to which the camera device manufacturer belongs, and a network operator.

Further, determining whether the device identification information is included may be determining whether the device identification information in the signed data is the same as the device identification information acquired in the camera device 110 when the signed information is determined to be valid. The device identification information may include, for example, at least a MAC address of a communication interface included in the camera device 110. Further, the device identification information may include at least information generated on the basis of at least a part of a camera unit, a controller, and a storage included in the camera device 110. In addition, the device identification information may be information arbitrarily allocated per camera device.

When the license data has been successfully validated, the camera device 110 may install the application data (255). Then, the camera device 110 may transmit a result of the installation operation to the mediation device 120. The mediation device 120 may manage an application installation state of the camera device on the basis of the result of the installation operation and manage device identification information.

Figure 4:
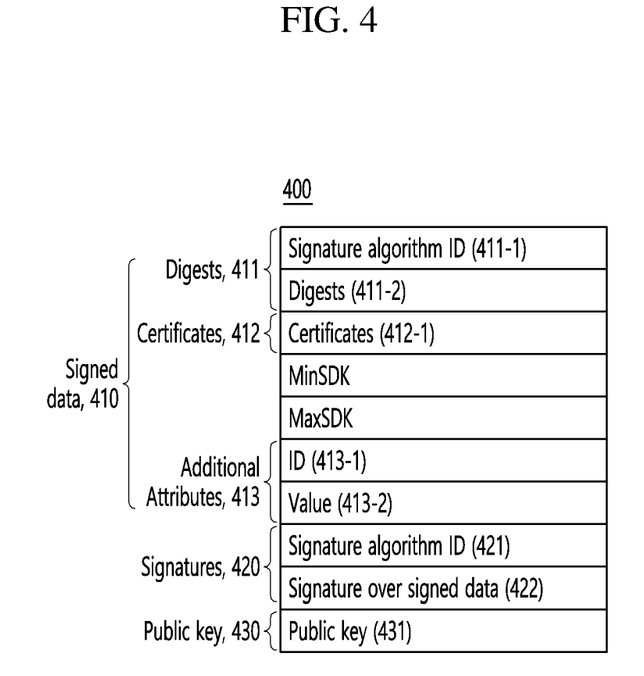
FIG. 4 illustrates an example of a configuration of license data.

FIG. 4 illustrates an example of a configuration of license data. License data 400 according to an embodiment disclosed in the present disclosure may include signed data 410, electronic signatures 420, and a public key 430.

Here, signed information may be used as the term including the signed data and the electronic signatures. The electronic signatures may be simply represented as "signatures".

The signed data 410 may include digests 411, certificates 412, MinSDK (Software Development Kit), MaxSDK, and additional attributes 413. The digests may include a signature algorithm ID 411-1 for identifying a type of an algorithm used for signatures and digests 411-2. The additional attributes may include device identification information for identifying a device, that is, an identifier (ID) 413-1 and a value 413-2. In addition, the signatures or electronic signatures 420 may include a signature algorithm ID 421 for identifying a type of an algorithm used for signatures and a signature over signed data 422.

The license data includes unique information (e.g., a device unique ID) for each application (or App or APP) installed for each device.

A camera device may validate received license data having the configuration of FIG. 4 on the basis of a certificate and device identification information (e.g., device ID) included in the license data and determine whether to install or execute application data according to the license data. Here, when the license data is included in the application data, validation of the license data may be construed as validation of the application data.

More specifically, the camera device may perform signature validation through signed information included in the license data and determine whether device identification information (e.g., first device identification information) included in the license data matches identification data thereof (e.g., second device identification information) to determine whether to install or execute the application data.

Here, the second device identification information may be device identification information included in the above-described application request message.

Here, the signature validation procedure may further include a procedure of validating a chain through an OSSA certificate.

That is, the camera device may install or execute the application data (or application) when signature validation is valid and the device identification information matches.

Here, although devices may have the same private key and certificate signing an application, devices have different IDs included in license data and thus different applications are generated for the devices. Accordingly, an application may be installed or executed in a device having a specific device ID. Due to this, validation of license data or application data proposed in the present disclosure has a feature different from conventional methods.

Figure 5:
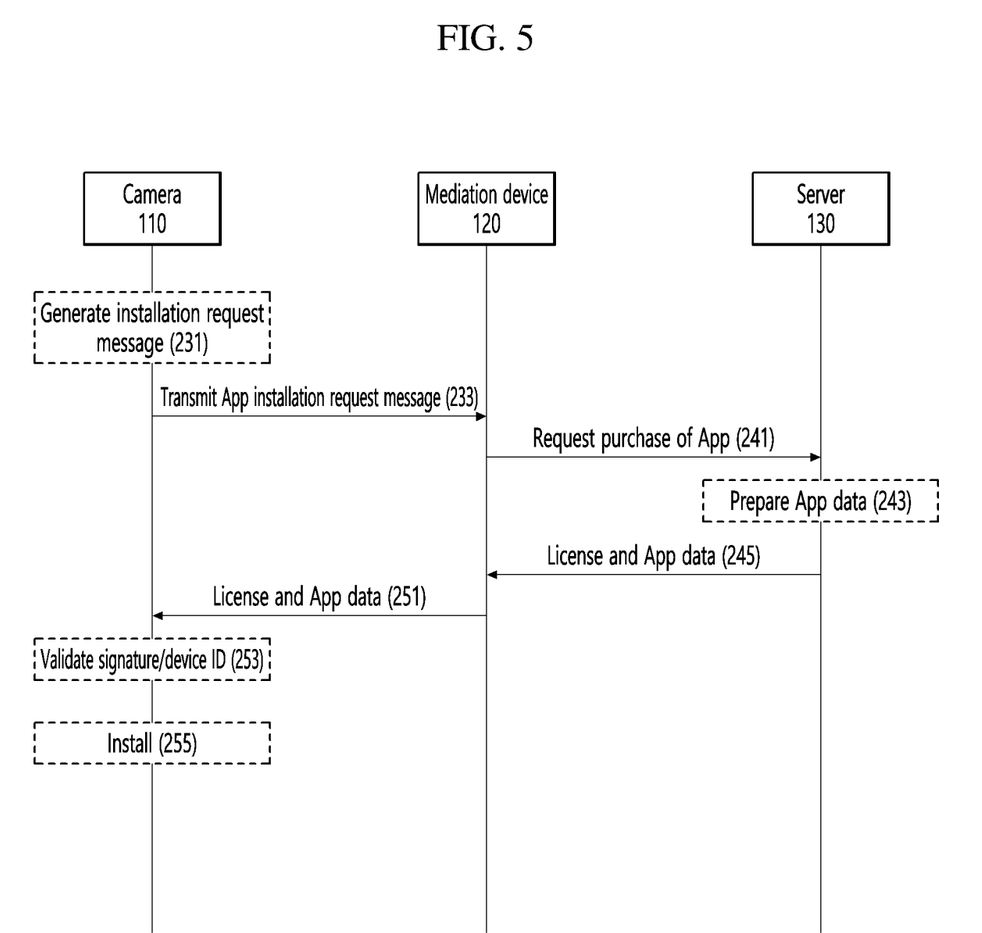
FIG. 5 is a flowchart briefly illustrating the license validation and application installation method of the camera device.

FIG. 5 is a flowchart briefly illustrating the license validation and application installation method of the camera device. Description of the same operations as those in FIG. 3 will be omitted.

The camera device 110 generates an installation request message after camera authentication (231) and transmits the installation request message to the mediation device 120. The installation request message includes the device identification information of the camera device 110. The mediation device 120 transmits the received installation request message to the server 130 that completes user authentication, and the server 130 generates application data and license data on the basis of the device identification information and application information included in the installation request message (243) and returns the application data and the license data to the mediation device (245). The mediation device 120 transmits the application data and the license data to the camera device 110, and the camera device 110 may install the application data upon successful validation of the license data as described above.

Figure 6:
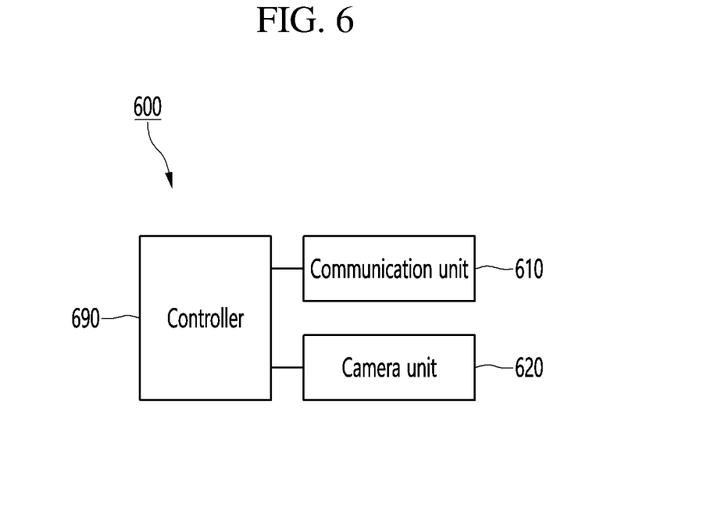
FIG. 6 illustrates a camera device according to an embodiment.

FIG. 6 illustrates a camera device according to an embodiment. The camera device 600 may include a communication unit 610, a camera unit 620, and a controller 690. The communication unit 610 may be configured to perform communication with a mediation device. The camera unit 620 may be configured to acquire an image therearound through an image sensor according to system settings. The controller 690 is electrically connected to the communication unit 610 and the camera unit 620 and configured to execute a program for controlling the communication unit 610 and the camera unit 620. The controller 690 may perform an operation of receiving an authentication request from the mediation device and an operation of transmitting a request message for requesting application installation from a server to the authenticated mediation device after the mediation device has been successfully authenticated. The request message may include device identification information of the camera device 600, and the device identification information may be generated on the basis of at least a part of system information, such as a MAC address of the communication unit 610 and a serial number of the camera unit 620.

The controller 690 may perform license validation including an operation of receiving signed information and application data from the mediation device and an operation of determining whether the signed information includes the device identification information and determining whether the signed information according to the server is valid.

The controller 690 may perform an operation of installing the application data in the camera device upon successful license validation.

Figure 7:
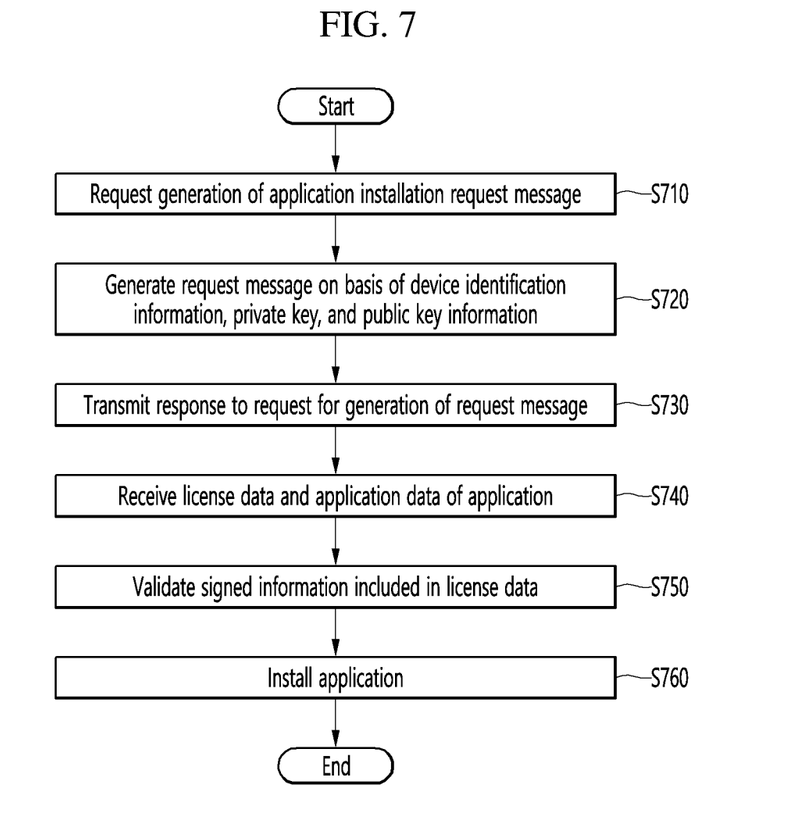
FIG. 7 is a flowchart illustrating an example of an operating method of a camera device for managing a license of an application proposed in the present disclosure.

FIG. 7 is a flowchart illustrating an example of an operating method of a camera device for managing a license of an application proposed in the present disclosure.

A camera device may be directly connected to a server through a first network or indirectly connected to the server through a mediation device and a second network. That is, when the camera device is directly connected to the server through the first network, the camera device may download an application from the server and install the application therein without being connected to the mediation device.

However, when the camera device is not connected to the first network, for example, when the camera device is not connected to a wired/wireless public Internet, the camera device may be indirectly connected to the server through the mediation device and the second network to download and install an application.

Steps S710 to S760 represent an example of a method of installing an application in the camera device when the camera device is not connected to the server through the first network or is disconnected from the server through the first network.

First, the camera device receives, from the mediation device, a request for generation of a request message for requesting installation of the application from the server (S710).

Then, the camera device generates the request message on the basis of device identification information of the camera device, a private key of the camera device, and public key information of the camera device (S720).

The request message may be generated in such a manner that the device identification information of the camera device is encrypted with the private key and the request message is generated on the basis of the public key information in a cryptographic correlation with the private key and the encrypted device identification information.

Here, the device identification information of the camera device is used when the request message is generated in order to prevent a third party that does not own a validated license from illegally copying and using an application and to allow only a predetermined number of cameras to install pay applications with validated licenses.

In the case of a nodelocked license, it is difficult to check a license through a server in general.

Accordingly, license validation can be performed by generating an electronic signature (using a private key for a license signature) using device identification information and confirming the signature using a certificate in a program or a public key (using a public key for license signature confirmation).

For example, in the case of an AXIS camera, pieces of information such as unique identification information included in the device, a validity term, and a software version are combined to generate a signature, and when the combined information including the identification information is forged/altered, inconsistency with the signature is checked to validate a license. If the unique identification information is not included, other devices can use the license and thus the license may become useless.

The camera device transmits a response to the request message generation request to the mediation device (S730).

Then, the camera device receives license data and application data of the application from the mediation device (S740).

Subsequently, the camera device validates signed information included in the received license data (S750).

Here, the signed information may include a certificate of a publisher, signed data, and an electronic signature with respect to the signed data.

Determination of whether the signed information is valid may be performed by validating the electronic signature using a public key included in the certificate of the publisher and determining whether the signed data is restored.

Additionally, determination of whether the signed information is valid may include chain validation of whether the certificate of the publisher is valid on the basis of a certificate of a management agency of an ecosystem to which the publisher belongs.

The camera device installs the application (S760).

The program license management method according to embodiments disclosed in the present disclosure can be implemented with computer-readable code in computer-readable recording media. The computer-readable recording media may include all kinds of recording devices capable of storing data readable by computer systems. Example of computer-readable recording media may include a ROM, a RAM, a CD-ROM, a magnetic tape, a floppy disk, an optical data storage device, and the like. Furthermore, as a computer-readable recording medium may be distributed to a computer system connected via a network, computer-readable code can be saved and executed according to a distributed system. In addition, a functional program, code and code segments for realizing the present invention may be easily deduced by a person skilled in the art.

Preferred embodiments of the technology of the present disclosure have been described with reference to the attached drawings. The terms or words used in the present disclosure and the claims should not be construed as limited to usual or lexical meaning and should be interpreted as the meaning and the concept in accordance with the technical spirit of the present invention.

The scope of the present invention is not limited to the embodiments disclosed in the present disclosure, and the present invention can be modified, changed, or improved in various manners without departing from the spirit or scope of the invention described in the appended claims.

It is possible to purchase or download an application issued for a specific camera device through a mediation device and to install the application in the camera device according to an embodiment disclosed in the present disclosure even when the camera device cannot be directly connected to a license issuance server.

Even when an operating system used in the camera device is configured to log in to an application distribution server through user-based authentication and to purchase an application, the camera device can purchase or download an application using a user authentication function of the mediation device in the same environment.

Although there is a problem that an application purchased through user authentication can be installed in any camera device when a universal operating system is used in camera devices, a function of purchasing an application only for a specific camera device can be executed on the basis of device identification information in an environment in which the license management method according to an embodiment disclosed in the present disclosure is adopted. In this case, a server operating agency that manages camera devices can control individual cameras by enabling or disabling license data for each device even for the same application.

What is claimed is:

1. A method for managing a license of a software application in a camera directly connectable to a server through a first network and connectable to the server through a mediator and a second network, the method comprising:
   the camera managing the software application being configured to be installed and executed in the camera;
   after the software application is pre-loaded in the camera, the camera receiving, from the mediator, a request by the server for the camera to generate a request message for the camera to install the pre-loaded software application;
   the camera generating the request message on the basis of device identification information of the camera, a private key of the camera, and public key information of the camera;
   the camera transmitting, to the mediator, a response to the request for generation of the request message;
   the camera receiving, from the mediator, license data and application data of the pre-loaded software application;
   the camera validating the pre-loaded software application by validating signed information included in the received license data of the pre-loaded software application; and
   the camera installing the pre-loaded software application in the camera.

2. The method of claim 1, wherein the generating the request message comprises:
   encrypting the device identification information of the camera with the private key; and generating the request message on the basis of the public key information in a cryptographic correlation with the private key and the encrypted device identification information.

3. The method of claim 1, wherein the signed information includes a certificate of a publisher, signed data, and an electronic signature over the signed data, and wherein whether the signed information is valid is determined by the camera validating the electronic signature using a public key included in the certificate of the publisher and determining whether the signed data is restored.

4. The method of claim 3, wherein determination of whether the signed information is valid includes chain validation of whether the certificate of the publisher is valid on the basis of a certificate of a management agency of an ecosystem to which the publisher belongs.

5. The method of claim 3, wherein determination of whether the device identification information is included includes determination of whether device identification information included in the signed information is the same as the device identification information included in the request message.

6. A method for managing a license of a software application, performed by a mediator, the method comprising:

the mediator managing the software application being configured to be installed and executed in the camera;

the mediator receiving, from the camera, an installation request message, of the software application, including device identification information, the camera being directly connectable to a server through a first network and connectable to the server through the mediator and a second network;

the mediator transmitting the installation request message of the software application to the server;

the mediator receiving, from the server, signed information including the device identification information and application information, and application data in response to the installation request message of the software application;

the mediator transmitting the signed information and the application data of the software application to the camera; and the mediator transmitting a camera authentication request to the camera, wherein the mediator receives the software application installation request message of the software application from the camera upon the camera's successful authentication in response to the mediator's camera authentication request.

7. The method of claim 6, wherein a right to order application installation is obtained from the camera as a result of the camera authentication.

8. The method of claim 6, wherein the installation request message of the software application is included in a request message for purchasing the application and transmitted to the server.

9. The method of claim 8, further comprising determining an access address of the server on the basis of information on the camera.

10. The method of claim 9, further comprising determining an address of the server on the basis of information on the camera.

11. A camera for managing a license of a software application, the camera being directly connectable to a server through a first network and connectable to the server through a mediator and a second network, the camera comprising:

a communicator configured to perform communication with the mediator; and a controller functionally connected to the communicator and configured to execute a program for controlling the communicator, wherein after the software application is pre-loaded in the camera, the controller is configured to execute the program including commands for performing;

an operation of receiving, from the mediator, a request by the server for the camera to generate a request message for the camera to install the pre-loaded software application, an operation of generating the request message on the basis of device identification information of the camera, a private key of the camera, and public key information of the camera;

an operation of transmitting, to the mediator, a response to the request for generation of the request message;

an operation of receiving, from the mediator, license data and application data of the pre-loaded software application;

an operation of the camera validating signed information included in the received license data of the pre-loaded software application; and an operation of installing the pre-loaded software application in the camera.

* * * * *